June 9, 1964 C. H. WHITLOCK 3,136,584
BULK MATERIAL HOPPER UNLOADER

Filed Jan. 25, 1963 2 Sheets-Sheet 1

INVENTOR.
CARL H. WHITLOCK
BY
Cullen, Sloman & Cantor
ATTORNEYS

June 9, 1964 C. H. WHITLOCK 3,136,584
BULK MATERIAL HOPPER UNLOADER
Filed Jan. 25, 1963 2 Sheets-Sheet 2
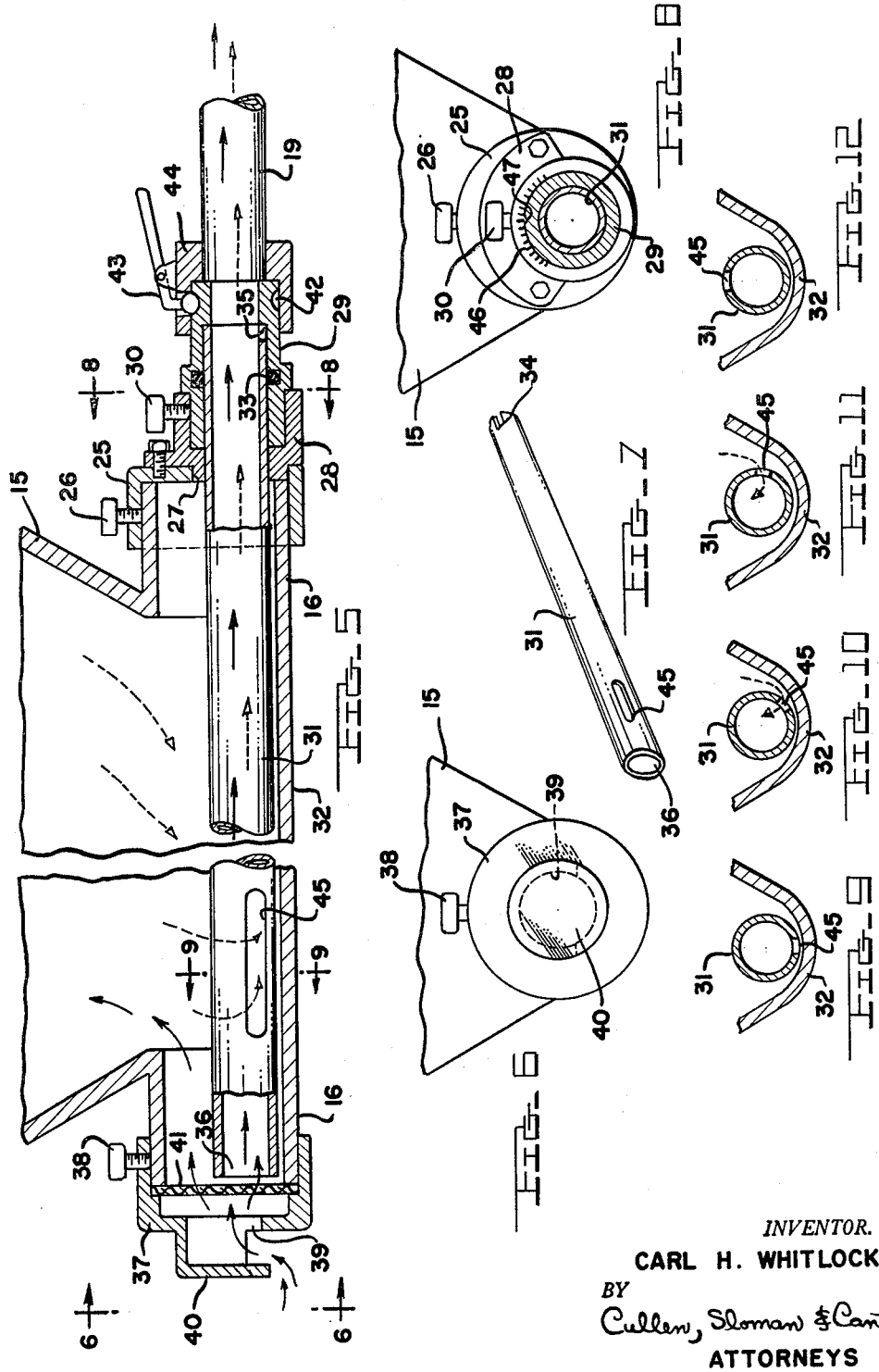
INVENTOR.
CARL H. WHITLOCK
BY Cullen, Sloman & Cantor
ATTORNEYS United States Patent Office 3,136,584
Patented June 9, 1964

3,136,584
BULK MATERIAL HOPPER UNLOADER
Carl H. Whitlock, Rochester, Mich., assignor to Whitlock Associates, Inc., Oak Park, Mich.
Filed Jan. 25, 1963, Ser. No. 253,891
6 Claims. (Cl. 302—52)

This invention relates to a bulk material hopper unloader and more particularly to a device for unloading dry, particulate, bulk material from a hopper.

Dry, bulk material, as for example, raw material plastics in the form of beads, granules, or powder, is commonly shipped from the supplier to the user in railroad hopper cars. These cars usually have separate hopper sections which are loaded with bulk material. Upon arrival of the car at its destination, it is common practice to unload the hopper by connecting a suction hose to the bottom of the hopper and sucking the dry material out of the hopper and into storage bins, etc.

Railroad hopper cars usually have substantially V-shaped hopper discharge bottoms, which are provided with a pair of aligned, horizontally extending tubular nozzles to which suction hoses are alternatively connected. Conventional suction equipment is relatively complex in construction, particularly as to control valves, and is relatively inefficient in operation, and normally sucks its required air supply through the top of the hopper, whose cover must remain open for this purpose, as well as through the load of bulk material in the hopper.

Hence, it is an object of this invention to provide a simply constructed, efficient, bulk material unloader, adapted for insertion into a conventional hopper car discharge nozzle, and having an accurately controllable rate of discharge, utilizing a simple slotted tube which cooperates with the adjacent portion of the hopper car discharge bottom to provide a control valve means, and arranged to suck its air supply from one of the hopper nozzles rather than from the top of the hopper.

A further object of this invention is to provide a hopper unloader in the form of a long tube which may be arranged transversely of a hopper bottom, exposed at one hopper nozzle to the air and extended out of the other hopper nozzle for connection to a suction hose, and having an elongated feed slot formed therein which slot may be adjustably positioned relative to the adjacent wall of the hopper bottom, to control the material to air ratio for thereby accurately controlling the rate of unloading.

These and other objects and advantages of this invention will become apparent upon reading the following description, of which the attached drawings form a part.

In the drawings:

FIG. 5 is a cross-sectional elevational view of the lower end of a hopper discharge portion with the unloader herein arranged in position for unloading.

FIG. 6 is an end view of the filter cap taken in the dition of arrows 6—6 of FIG. 5.

FIG. 7 is a perspective view of the tube.

FIG. 8 is an end view taken in the direction of arrows 8—8 of FIG. 5.

FIGS. 9–12 are views taken as if in the direction of arrows 9—9 of FIG. 5 and schematically illustrate various positions of the tube feed slot.

*Railroad Hopper Car*

Figures 1, 2:
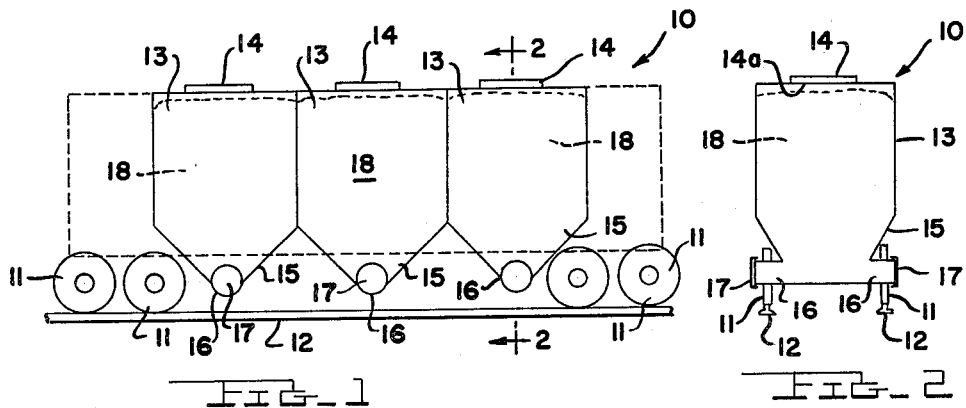
FIG. 1 is a schematic elevational view of a conventional type of railroad hopper car.
FIG. 2 is a cross-sectional, schematic, view taken in the direction of arrows 2—2 of FIG. 1.

FIGS. 1 and 2 schematically illustrate a railroad hopper car 10. While the specific details of construction may vary from one car to another, such cars generally include a frame work of some sort mounted upon railroad wheels 11, which rest upon railroad tracks 12, and a number of separated hoppers 13. These hoppers have doors 14 covering openings 14a through which the hoppers are loaded and also have substantially V-shaped, sloping, discharge bottom portions 15 with aligned outwardly extending tubular nozzles 16 which are normally closed by removable closures or caps 17 held in place by bolts or the like.

*Conventional Method for Unloading Hopper Car*

Figure 3:
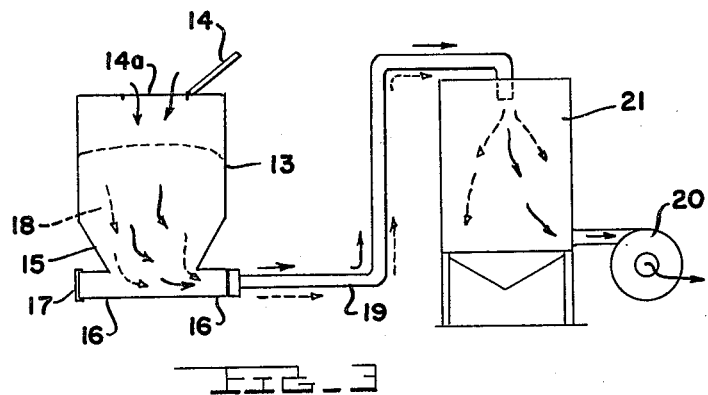
FIG. 3 is a schematic view showing the conventional method for unloading bulk material from the car.

The conventional method for unloading the hopper car (see FIG. 3) consists of (a) opening the door 14 on one hopper to permit air to enter; (b) removing the cap 17 from the nozzle which is closest to the suction equipment; (c) connecting the end coupling of suction hose 19 to the uncapped nozzle; (d) turning on suction blower 20 to suck material (dotted arrows) and air (solid arrows) drawn in through the open doorway into a storage bin 21.

*The Novel Apparatus*

Referring to FIG. 5, the apparatus herein includes a housing cap 25 which replaces the conventional closure 17 during the unloading period and which is held on the nozzle 16 by a suitable fastener such as a thumb screw 26. An opening 27 is formed in the housing cap, and bolted to the housing, at the opening, is an adapter 28 forming a cylindrical socket within which is inserted a sleeve 29. The sleeve 29 is rotatable within the socket and is fixed in position by a thumb screw 30 or the like.

A long tube 31 extends transversely of the hopper bottom 15 closely above the bottom floor 32 thereof. One end of the tube passes into the sleeve 29 and is sealed thereto by sealing ring 33. The end of the tube is notched at 34 to receive a key 35 formed on the interior of the sleeve so that the tube and sleeve rotate together.

The opposite end 36 of the tube is located within but closely adjacent to the free end of the opposite nozzle 16. The closure 17 at this end is also removed for the duration of the unloading operation and is replaced by a filter cap 37, held in place by a set screw 38 or the like.

An opening 39, partially covered by a shielding shroud 40, is formed in cap 37 and a filter 41, formed of suitable filtering material, is arranged in cap 37, adjacent to, but spaced a short distance from the end of the tube 31, so that air may pass either into or around the tube 31.

The free end of the sleeve 29 is provided with a groove 42 to which is attached the coupler lock 43 of a conventional coupler 44 connected to the end of the suction hose 19.

The tube 31 is provided with an axially elongated, narrow slot 45 preferably located near the end 36 thereof. Through this slot the bulk material enters the tube.

The radial location of the slot 45 is fixed by rotating the sleeve 29 relative to the socket 28 and then tightening the thumb screw 30. In order to determine the proper location, indicia 46 is formed on the exterior of the socket (see FIG. 6) and a guide mark 47 is formed on the sleeve.

*Operation*

Figure 4:
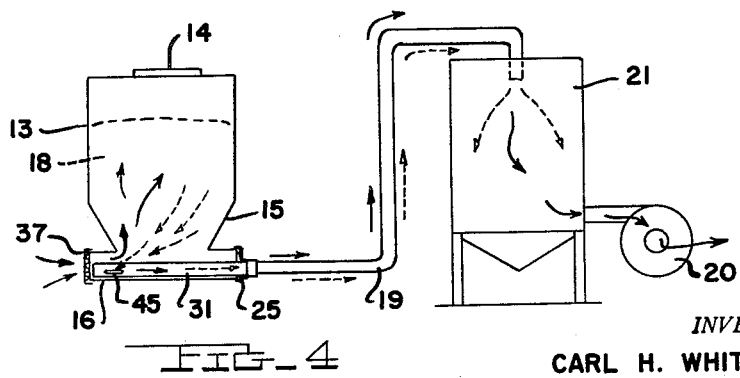
FIG. 4 illustrates schematically the method and apparatus, of this invention, for unloading the same car.

In operation (see FIG. 4), both closures 17 are removed from the nozzles 16 and are replaced by housing cap 25 and filter cap 37. Tube 31 and sleeve 29 are positioned in place and rotatably adjusted to locate the slot 45 as desired. Then, the suction hose 19 is coupled to the sleeve 29 and suction blower 20 is turned on to suck air (see solid line arrows) into the tube through the filter cap and bulk material (see dotted line arrows) into the tube through slot 45. The mixture is swirled through the tube, the hose 19 and into the storage bin 21. Also, filtered air flows into the hopper to replace the air drawn therefrom. The hopper door 14 may be kept closed or may be opened slightly as a safety precaution to prevent the walls of the hopper from collapsing. When the hopper is unloaded, the tube 31 is withdrawn, while suction is maintained to scavenge the last of the material through the slot 45. Then the caps 25 and 37 are removed and caps 17 replaced.

The flow of material out of the hopper is controlled by the positioning of the slot relative to the bottom of the hopper. Hence, when the slot is positioned directly downwardly (see FIG. 9) the material flow is shut off. When the tube is rotated so that the slot opens upwardly (see FIG. 12) the material flows in at a maximum rate, although in this position the flow may be so rapid as to plug up the tube. Usually, for best results the slot should open horizontally or below the horizontal. FIGS. 10 and 11 indicate intermediate positions of low and higher feeds respectively.

The size and weight of the particles of bulk material affect the best ratio of material feed to air feed so that the position of the slot is changed as necessary for each specific material.

This invention may be further developed within the scope of the following claims. Accordingly, it is desired that the foregoing description be read as being merely illustrative of an operative embodiment of this invention and not in a strictly limited sense.

I now claim:

1. A bulk material unloader for hopper having a substantially V-shaped in cross section, elongated bottom discharge portion with a horizontally arranged bottom floor and a pair of aligned tubular nozzles opening in said portion at the opposite ends thereof and adjacent said floor, said nozzles being provided with closures for normally closing off their free, open ends; said unloader comprising a housing cap arranged for covering one of said nozzles upon removal therefrom of its respective closure; an elongated tube extended through and being rotatably adjustably mounted in an opening formed in said housing cap, with one end of the tube being extended outwardly of the housing cap and nozzle and having means connected thereto for connection to a suction hose, the tube being sealed within the housing cap opening, said tube extending the length of said bottom floor and having its opposite end positioned closely adjacent to the free end of the opposite tubular nozzle so that upon removal of the respective closure air may flow into and through said tube; said tube being located closely adjacent to said floor and being of considerably smaller diameter than the diameter of the tubular nozzles; an axially extending, narrow slot formed in the tube, said slot being positionable at various radial angles relative to the tube axis for adjusting the flow of bulk material therethrough by rotatably adjusting the tube within the housing cap, and said housing cap having means formed thereon for fixing the position of the tube within said opening.

2. A construction as defined in claim 1 and including a filter cap shaped to fit over and cover the free end of said opposite tubular nozzle and being positioned upon said nozzle in place of its respective closure when the tube is positioned within the hopper discharge portion; said filter cap having a central opening, formed through it for the passage of air, spaced a distance from said tube opposite tube end and covered by a filter positioned within the filter cap between the tube and the filter cap opening so that air may blow into said opposite nozzle and into the hopper bottom portion as well as into the tube.

3. A construction as defined in claim 1 and said housing cap having a cylindrically shaped socket secured to it, the socket being coaxial with the housing cap opening, a cylindrically shaped sleeve fitted in said socket and the tube being closely fitted within and secured to said sleeve; and the means for connecting the tube to the suction hose being formed on the free end of the socket; the sleeve being rotatable with the tube within the socket, and a set screw mounted on the socket for engaging the sleeve to fix the sleeve in predetermined rotated positions for thereby positioning the slot.

4. A construction as defined in claim 1, and said slot being located near said opposite end of the tube.

5. A bulk material unloader for a hopper having side walls with two relatively small, horizontally axised openings formed therein near the bottom of the hopper, comprising an elongated tube inserted into the hopper through one of said openings and having a discharge end extending outwardly of the hopper and means connected to the discharge end for connection to a suction hose, said one opening being sealed to the tube and the tube being rotatably adjustably fixed to the hopper at said one opening; the opposite, suction, end of the tube being located closely adjacent the second of the said openings for passage of air entering through said second opening into the tube and also around the tube into the hopper; an axially elongated, narrow slot formed in the tube, with the position of the slot relative to the vertical being adjustable by rotatably adjusting the tube.

6. A construction as defined in claim 5, and said slot being located near said opposite end of the tube.

References Cited in the file of this patent

UNITED STATES PATENTS

| | | |
|---|---|---|
| 2,858,165 | Oliver | Oct. 28, 1958 |
| 3,048,449 | Aller | Aug. 7, 1962 |
| 3,105,721 | Collins | Oct. 1, 1963 |

FOREIGN PATENTS

| | | |
|---|---|---|
| 106,543 | Austria | May 25, 1927 |